May 11, 1926.
W. F. DRAKE
1,584,518
AUTO COVER
Filed July 24, 1925      2 Sheets-Sheet 1
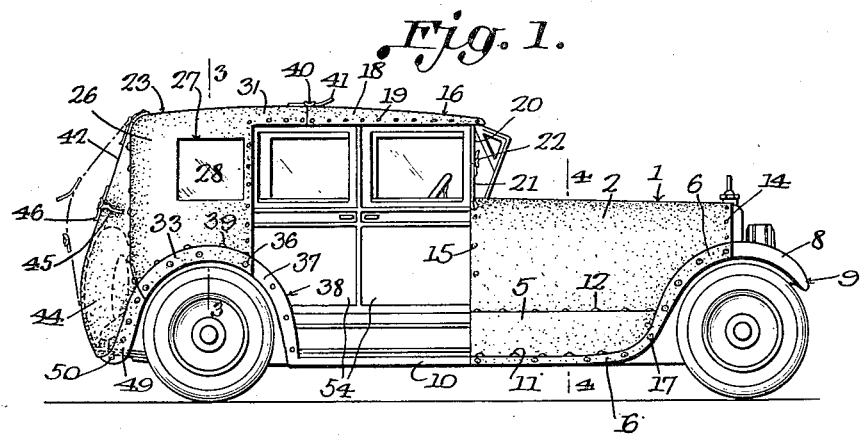
Inventor
William F. Drake
By C. A. Annosbo.
Attorney May 11, 1926.  
W. F. DRAKE  
AUTO COVER  
Filed July 24, 1925  
1,584,518  
2 Sheets-Sheet 2
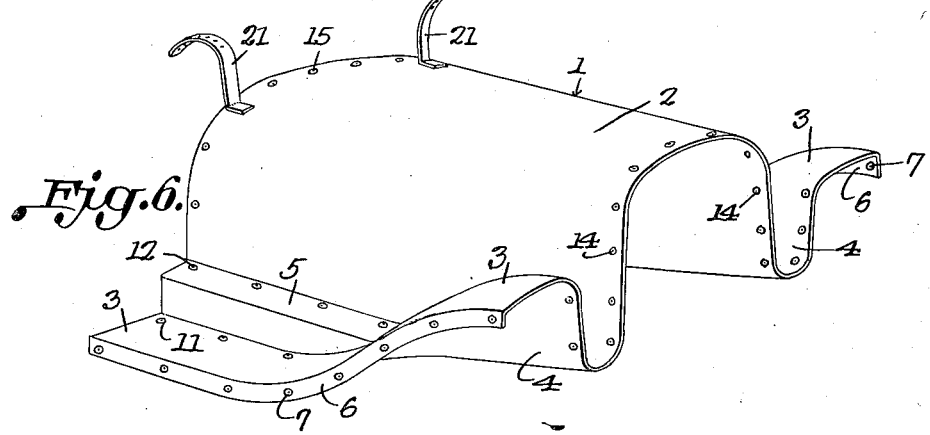
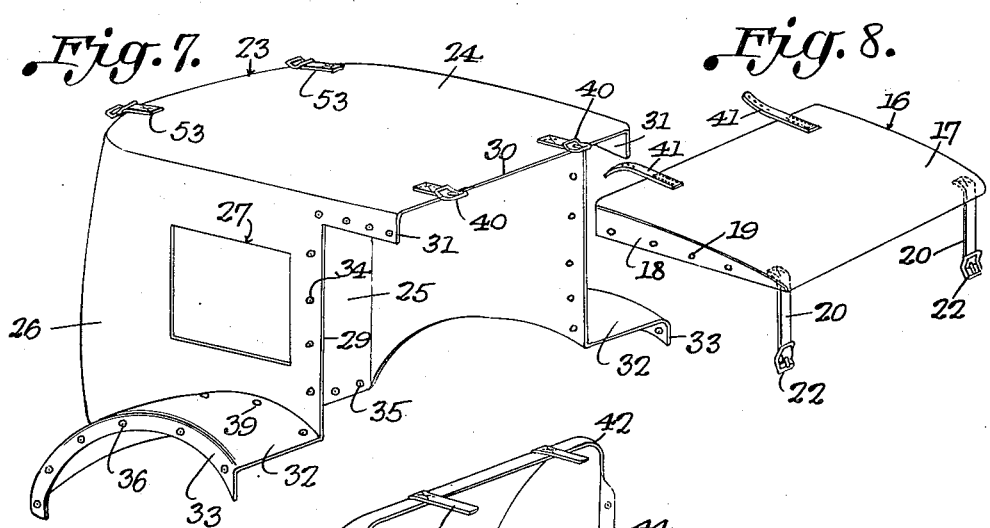
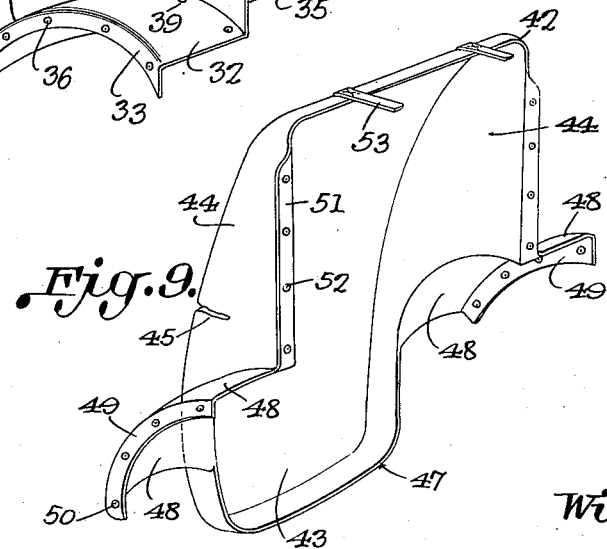
Inventor  
*William F. Drake*  
By *C. A. Sawrthe.*  
Attorney Patented May 11, 1926.

1,584,518

UNITED STATES PATENT OFFICE.

WILLIAM F. DRAKE, OF PUEBLO, COLORADO.

AUTO COVER.

Application filed July 24, 1925. Serial No. 45,871.

This invention aims to provide novel means for covering an automobile, to prevent the finish on the automobile from being damaged while touring, the device being so constructed that it will form an adequate protection for the automobile, it being possible to remove the device readily from the automobile, upon occasion.

It is within the province of the disclosure to improve generally and to enhance the utility of devices of that sort to which the invention appertains.

With the above and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed, without departing from the spirit of the invention.

In the accompanying drawings:—

Figure 1 shows in side elevation, a device constructed in accordance with the invention, applied to an automobile; Figure 2 is a rear elevation; Figure 3 is a diagrammatic transverse section taken about on the line 3—3 of Figure 1; Figure 4 is a cross section taken on the line 4—4 of Figure 1; Figure 5 is a sectional view showing how the device is assembled with the fenders; Figure 6 is a perspective view disclosing the forward member; Figure 7 is a perspective view wherein the rear member appears; Figure 8 is a perspective view disclosing a part of the top cover; Figure 9 is a perspective view disclosing the tire cover and baggage cover.

The device forming the subject matter of this application preferably is made of flexible waterproof material and includes a hood cover 1, shown in detail in Figure 6.

The hood cover 1 comprises an arched body 2, adapted to fit around the hood of an automobile. Combined fender and foot-board guards 3 extend longitudinally of the body 1, at the sides thereof. The forward portions of the fender and foot-board guards 3 are connected by reversed bends 4 with the side portions of the body 1. The rear parts of the fender and foot-board guards 3 are connected by angular offsets 5 with the side portions of the body 2. The members 3 have depending lips 6.

The body 2 fits closely and snugly over the hood of an automobile, the bends 4 extend downwardly between the sides of the hood and the inner walls of the front fenders 9, the parts 3 extending across the tops of the front fenders, and backwardly upon the foot board 10, the offsets 5 receiving the correspondingly shaped parts of the automobile, and the lips 6 of the parts 3 coacting with depending flanges 8 of the front fenders 9—all of which will be understood readily when Figure 6 is compared with Figure 1. Separable fasteners 7 connect the depending lips 6 with the flanges 8 of the front fenders 9. Fasteners 11 connect the parts 3 with the foot board 10 and with the front fenders 9. Separable fasteners 12 connect the offsets 5 with the corresponding parts of the body of the automobile. There is a transverse line of fasteners 14 on the forward end of the body 2, and these fasteners connect the forward end of the body with the hood of the car. A transverse line of fasteners 15 connect the rear end of the body 2 with the hood of the car. Figure 1 shows that the cover 1 extends from the forward end of the hood back to the cab of the car and covers not only the hood, but, as well, portions of the front fenders 9 and the forward portions of the foot boards 10, as well as any offset parts which may exist, on the body of the car, between the hood on the one hand and the foot board and the forward fenders on the other hand.

A top cover 16 is provided, the same being shown in detail in Figure 8. The top cover 16 comprises a body 17 equipped along its edges with depending flanges 18 carrying fasteners 19 adapted to hold the cover 16 on the edges of the top of the car, the top cover 16 being trough-shaped, in cross section. In the event that the manufacturer or the user desires to connect the top cover 16 with the rear end of the hood cover 1, any suitable means may be provided for carrying out the result mentioned. If preferred, there may be depending straps 20 on the forward end of the top cover 16, the straps 20 being joined detachably to upstanding straps 21 on the rear end of the body 2 of the hood cover 1, by means of buckles 22.

The device comprises a combined body and top cover 23 which is shown in Figure 7, the said cover including a top 24, a back 25 and sides 26, there being openings 27 in the sides 26 which expose the side windows 28 of the car, although, of course, considerable latitude is desired at this point, depending upon the make and construction of the car. The sides 26 of the cover 23 are cut away as at 29, the forward portion of the top 24 forming an extension 30 having depending side wings 31. The sides 26 of the cover 23 carry laterally extended curved guards 32 having depending lips 33. The way in which the cover 23 is mounted on the car will be obvious when Figure 7 is compared with Figure 1. Fasteners 34 extend upwardly along the forward edges of the sides 26, and forwardly along the wings 31, the fasteners 34 serving to hold the sides 26 on the body of the car, and on the edges of the top of the car. Fasteners 35 connect the back 25 with the rear portion of the car. Fasteners 36 connect the lips 33 with the depending flanges 37 of the rear fenders 38, fasteners 39 connecting the guards 32 with the rear fenders 38, at points adjacent to the sides 26. Referring to Figure 5, there is now a basis in the description for the statement that all of the fasteners hereinbefore and hereinafter mentioned may be in the form of separable snap fasteners, although this detail is not insisted upon. The rear end of the body 17 of the top cover 16 is joined to the forward end of the part 30 by any suitable means, for instance, buckles 40 on the top 24, adapted to be engaged by straps 41 on the rear portion of the body 17 of the top cover 16.

The device comprises a tire and luggage cover 42, shown in detail in Figure 9. The member 42 comprises a back 43 and sides 44, there being considerable slack in the back and in the sides, as shown at 45, so that luggage may be stowed within the cover 42, it being possible to take out the slack by means of tightening devices, such as straps and buckles 46, mounted on the back 43 of the cover 42. The lower portions of the sides 44 and the back 43 form a depending extension 47 which is adapted to receive the tire which is on the rear tire holder. The sides 44 carry laterally prolonged and rearwardly extending curved guards 48 having depending flanges 49, connected by fasteners 50 with the flanges 37 of the rear fenders 38, the parts 48 and 32 cooperating to cover the rear fenders. The sides 44 are supplied at their forward edges with outstanding wings 51 connected by fasteners 52 with the back 25 of the body cover 23. Connections 53, such as straps and buckles, connect the upper edge of the back 43 of the tire and luggage cover 42 with the top 24 of the body cover 23.

The device, although simple in construction, will be bound to be thoroughly efficient in yielding and protecting a car. It is to be observed that the side doors 54 of the car are not covered, it being possible, therefore, to open these doors readily, although the doors, too, might be protected if desired. Owing to the fact that the device is cut away, adjacent to the doors 54, the bulk of the device is cut down considerably, and it can the more readily be mounted on an automobile.

Having thus described the invention, what is claimed is:—

1. In a device of the class described, a body cover comprising a top, a back and sides, the sides having outstanding curved fender guards, the sides being cut away at their forward edges to form an extension at the forward end of the top, an auxiliary top cover, means for connecting the rear end of the auxiliary top cover detachably with the forward end of the extension, and means for holding the body cover on a car.

2. A device of the class described, constructed as set forth in claim 1, and further characterized by an arched hood cover located in front of the top cover and at a lower elevation than the top cover, and separable, substantially vertical connections between the rear end of the hood cover and the forward portion of the top cover.

3. A device of the class described, constructed as set forth in claim 1, and further characterized by the provision of a tire and luggage cover including a back and side, the sides having laterally extended curved guards supplemental to the fender guards of the body cover and cooperating therewith, and means for joining the luggage and tire cover detachably to the body cover, the rear portions of the back and the sides of the luggage and tire cover forming an extension for the reception of a tire and tire holder on a car.

In testimony that I claim the foregoing as my own, I have hereto affixed my signature.

WILLIAM F. DRAKE.